Dec. 5, 1950   R. M. MAGNUSON   2,532,633
QUICK FREEZE APPARATUS
Filed Jan. 10, 1947   2 Sheets-Sheet 1
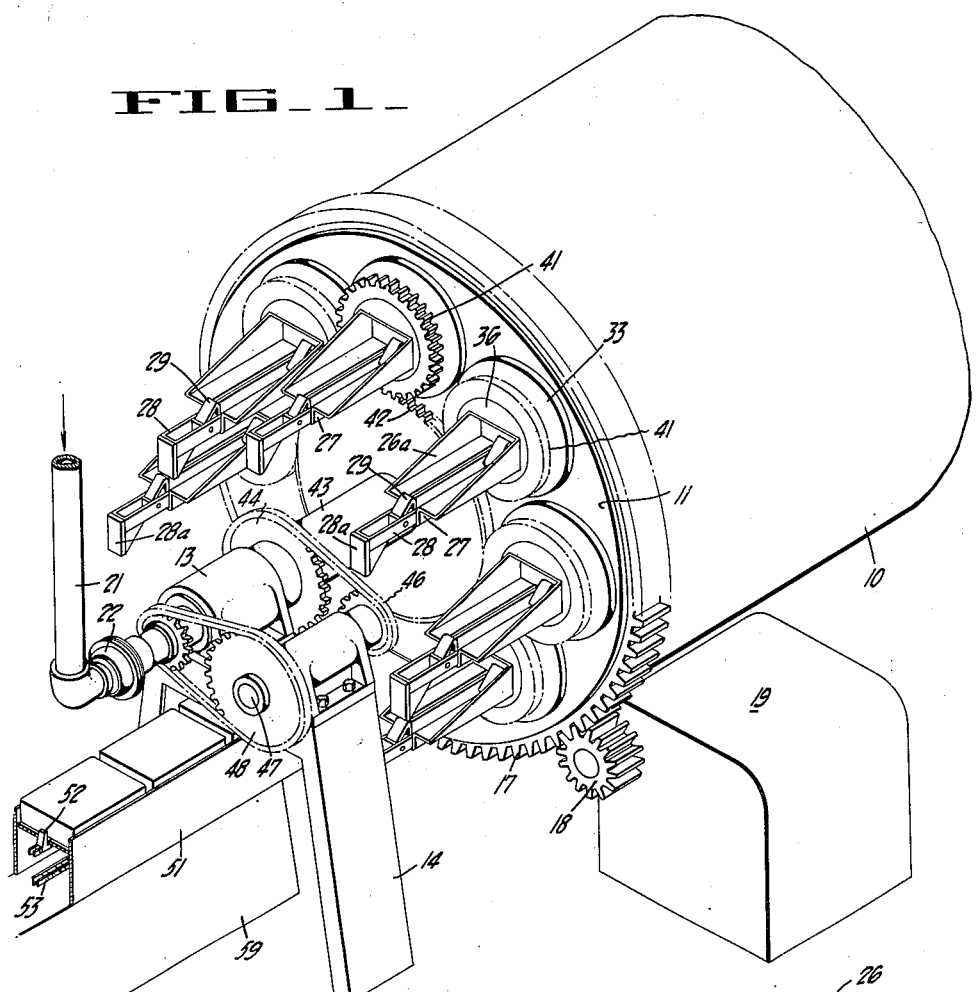
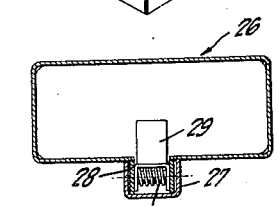
FIG_3_
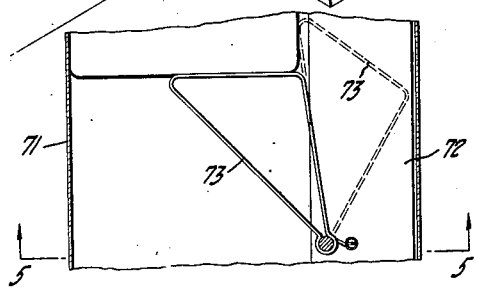
FIG_4_
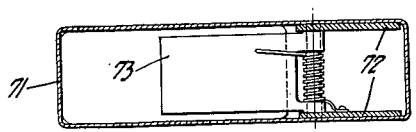
FIG 5
INVENTOR.
Roy M. Magnuson
BY Harper Allen

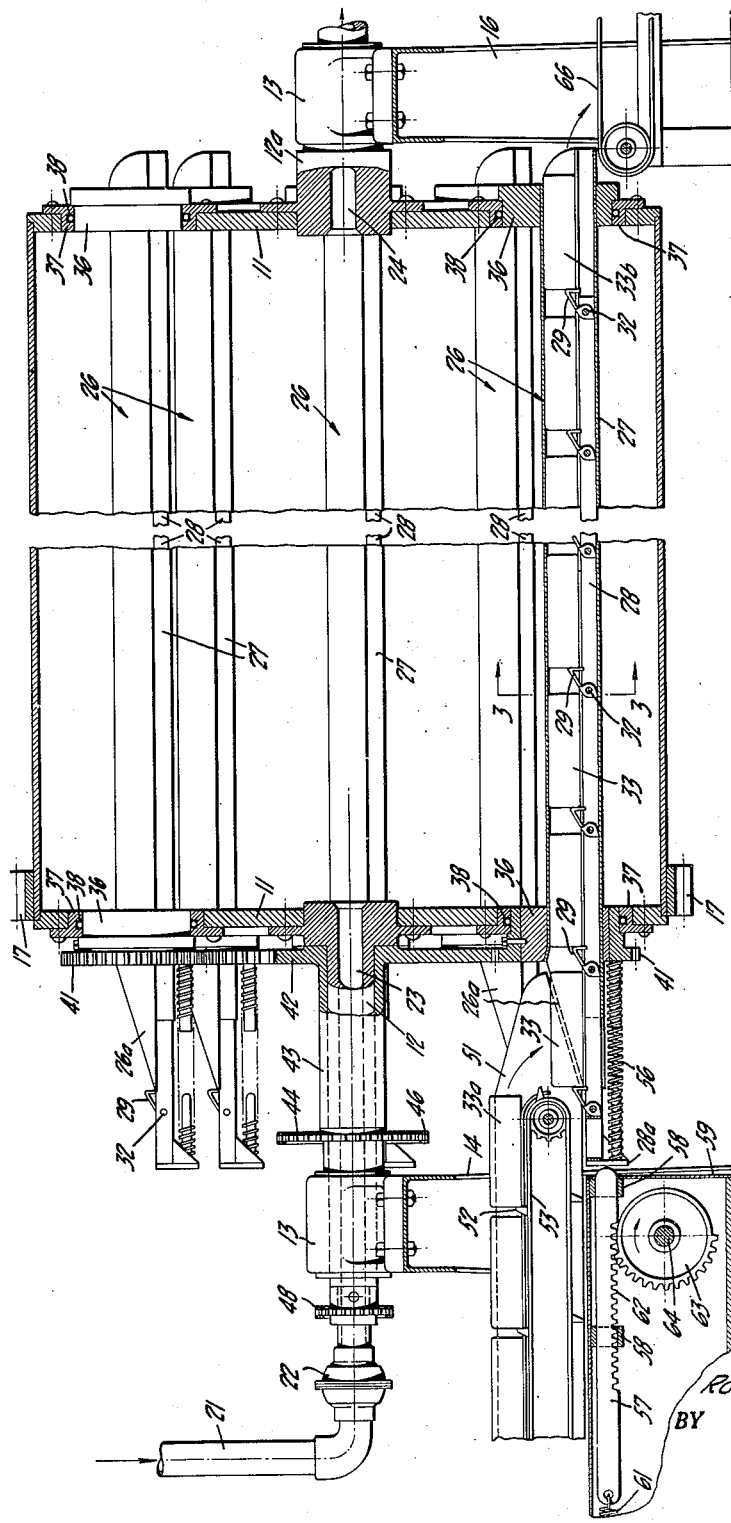

Patented Dec. 5, 1950

2,532,633

UNITED STATES PATENT OFFICE 2,532,633

QUICK-FREEZE APPARATUS

Roy M. Magnuson, Campbell, Calif., assignor of one-third to George H. Ballantyne, San Jose, Calif., and one-third to Cassius L. Kirk, Bozeman, Mont.

Application January 10, 1947, Serial No. 721,384

14 Claims. (Cl. 62—114)

This invention relates to quick freeze apparatus and is concerned more particularly with the provision of apparatus of the above character which operates in a continuous fashion with respect to packaged food.

It is a general object of the invention to provide an improved quick freeze apparatus.

Another object of the invention is to provide a quick freeze apparatus in which continuous processing of the food to be frozen can be effected.

A further object of the invention is to provide quick freeze apparatus of a rotary type in which the orientation of the packages of food is maintained during the freezing operation to avoid any leakage or spilling of the contents.

A further object of the invention is to provide quick freeze apparatus attaining the foregoing objects and employing freezing tunnels through which the packaged food is progressed.

Other objects and advantages of the invention will be apparent from the following description of a preferred embodiment thereof as illustrated in the accompanying drawings, in which:

Figure 1 is a perspective view of the feed end of the apparatus.

Figure 2 is a longitudinal sectional view through the apparatus.

Figure 3 is a fragmentary vertical sectional plan view through one of the freezing tubes or tunnels as indicated by the line 3—3 in Figure 2.

Figure 4 is a fragmentary horizontal sectional view of a modified form of freeze tunnel or tube.

Figure 5 is a vertical sectional view of the tunnel shown in Figure 4 being taken as indicated by the line 5—5 therein.

As explained generally above, the present invention provides for the continuous processing of packages of food in quick freezing operations and in general the invention contemplates the provision of a quick freeze structure embodying one or more freezing paths extending between a feeding or loading station and a discharge station so that the packages of food can be processed in a continuous and automatic manner.

In the embodiment selected for illustration, the freezing structure comprises a cylinder 10 forming a refrigerant chamber and having its end plates 11 carrying shaft extensions 12 and 12a which are journalled in suitable bearings 13 on respective support brackets 14 and 16. The drive for the freezing structure includes a large gear 17 secured thereon adjacent one end and meshing with a drive pinion 18 which may be driven in any suitable manner from a drive mechanism indicated generally at 19. This drive mechanism may be of a slow continuous rotative type or it may be of an intermittent rotative type such as a Geneva mechanism.

Associated with the freezing structure is a suitable source of refrigerant (not shown) which passes the refrigerant through an intake pipe 21 and a coupling device 22 to a passage 23 leading through the shaft 12 at the feed end of the structure. The passage 23 opens into the interior of the cylinder 10 to admit the refrigerant (such as brine or a suitable refrigerating gas) thereto, and the refrigerant is exhausted from the cylinder through a passage 24 in the support shaft 12a at the discharge end of the cylinder for return to the refrigerating mechanism.

As illustrated in the present embodiment, the freezing structure or cylinder 10 is provided with a series of peripherally spaced freezing tubes or tunnels 26 of the general character disclosed and claimed in the copending application of Cassius L. Kirk, Serial No. 603,715, filed July 7, 1945, for Quick Freeze Tunnel. Each of the tunnels 26 comprises a freezing tube of sheet metal construction or of other suitable heat conductive material which conforms to the outline of the package to be frozen. As seen in Figure 3, in the present instance the tube 26 is rectangular in outline with slightly rounded corners and having at the bottom a recessed guide or trackway 27 for a feed rack 28 of the one-way type. The feed rack 28 carries a series of one-way pawls 29, each of which is urged to active position by an associated torsion spring 31 disposed about the pivot pin 32 for the pawl. As seen in Figure 2, endwise movement of the rack 28 to the right will result in a one-step advance of the food packages 33, and, upon return movement of the rack, the pawls 29 will yield and pass beneath the next package to be advanced thereby.

Each of the freezing tubes 26 is mounted within the cylinder 10 by respective bearing collars 36 secured thereon as by welding. Each collar 36 is disposed within a flanged bearing 37 secured in an opening in the adjacent end wall 11 of the cylinder. A seal ring 38 is provided within each bearing 37 and engaging the cooperating collar 36.

During the initial stage of freezing of packaged foods containing a brine or syrup, it is important with certain types of carton packages that the package be maintained with its lid upright until the freezing operation has progressed enough so that a frozen shell within the package provides a seal. In accordance with the instant invention, the freezing tunnels are rotated in synchronism with the rotation of the freezing structure so that the freezing tunnels always maintain the same orientation. For this purpose each tube 26 is provided with a gear 41 at one end which meshes with a central drive gear 42 having its hub 43 journalled on the shaft 12. The hub 43 carries a sprocket 44 which is driven through a chain 46 from a suitable sprocket on a countershaft 47 journalled on the standard 14. At its other end the countershaft 47 is connected through a suitable sprocket and chain drive 48 to the shaft 12 so that a drive is transmitted from the cylinder 10 to each of the freezing tunnels 26 and the gear ratios are so selected that the tunnels 26 revolve once for each revolution of the cylinder and thereby always maintain the same orientation.

The feeding or loading mechanism for successively introducing packages of frozen food into the freezing tunnels 26 may comprise a feeding chute 51 having a slotted bottom in which a series of feed dogs 52 on a feed chain 53 travel. The feed chute 51 is disposed above the path of travel of the projecting ends 26a of the freezing tunnels 26 so that a package 33 of frozen food can be deposited on each of the projections 26a as they register with the feed mechanism described above. The feed racks 28 also project into the feeding zone to provide a spacing of their endmost pawl 29 to receive a package of food for feeding into the flared end of the tunnel. This projected position of the feed racks 28 is maintained in each case by a suitable spring mechanism 56.

An intermittent drive mechanism is provided for the feed racks 28 in the form of a feed bar 57 slidably mounted in suitable brackets 58 within a housing 59 and spring urged to the rear by a suitable tension spring 61. The bar 57 is provided with a rack 62 whose teeth mesh with a segmental gear 63 carried on a shaft 64 in the casing 59. The shaft 64 is driven as indicated by the arrow so that at suitable timed intervals when a feed rack 28 is aligned therewith the bar 57 is driven to the right to engage the depending end 28a of the rack 29 aligned therewith at the loading station and to advance the rack and the packages of food therewith with respect to the tunnel so that one additional package of food is introduced into the tunnel.

At the same time that the new unfrozen package of food is fed into one end of each of the tunnels 26 the rack 28 becomes effective to discharge a processed package of frozen food as indicated at 33b from the discharge end of the tunnel onto a discharge belt 66 at the discharge station of the apparatus.

Figures 4 and 5 illustrate a modified tunnel and feed rack construction and in this case the tunnel 71 is of simple rectangular contour, but is wider in dimension than the package to be processed for accommodation of the feed rack 72 at one side of the series of packages. The feed rack 72 carries a series of spring-urged pawls 73 which during withdrawal of the rack will pass to one side of the packages as indicated by the dotted line position of the rack in Figure 4 to engage behind the next succeeding package in the tunnel.

In operation the packages of food to be frozen are fed in any suitable manner onto the loading chute 51 for engagement by the dogs 52 so that a package of food 33a is in position for discharge onto the aligned projecting portion 26a of the operative freeze tunnel 46 ahead of the innermost feed pawl 29 thereof. The feed rack 28 is then advanced by the operating bar 57 therefor so that the package of food is introduced into the freezing tunnel. Where continuous rotation of the freezing structure is employed, the speed is slow enough to allow feeding of a package while the active freezing tube is passing through the loading station. Also, the depending end 28a of the feed racks may be made of sufficient lateral dimension to remain in operative relation to the feed bar 57 to carry out the feeding of the package of food into the freezing tunnel. If intermittent rotative drive of the freeze structure is employed, the active freeze tunnel remains stationary at the loading station until the feed of a package is effected. Where strong containers such as tin cans are employed, the feed racks 28 are provided with only one pawl 29 and the cans are progressed in end-to-end engagement.

In either event, packages are fed preferably one package at a time to each of the freeze tunnels as they pass the loading station and eventually all of the freeze tubes or tunnels are filled with packages of food as illustrated in the lowermost tunnel in Figure 2. After the freezing tunnels become filled, each time a package of food is fed for freezing a frozen package of food is ejected. It will be noted that the packages of food themselves close the freeze tunnels to prevent undesired circulation of warm air therein.

While I have shown a preferred embodiment of the invention, it will be understood that the invention is capable of variation and modification from the form shown so that its scope should be limited only by the scope of the claims appended hereto.

I claim:

1. Quick freeze apparatus comprising a rotatable support structure carrying a plurality of circumferentially spaced quick-freeze paths disposed in longitudinal parallel relation therein, each path having a loading opening and a discharge opening, means for progressing material along each of said paths from its loading opening to its discharge opening so that the material passes through the support structure in a plurality of parallel paths, a loading station adjacent said structure, a discharge station adjacent said structure, and means for operating said structure to present said freezing paths successively to said stations with the respective openings of a path registering simultaneously with the respective stations.

2. Quick freeze apparatus comprising a rotatable support structure, a plurality of circumferentially spaced quick freeze paths rotatably mounted therein about respective circumferentially spaced axes, each path having a loading opening and a discharge opening, a loading station adjacent said structure, a discharge station adjacent said structure, means for operating said structure to present said freeze paths successively to said stations with the respective openings of a path registering simultaneously with the respective stations, and means for effecting rotation of each of the freeze paths about its axis during operation of the structure.

3. Quick freeze apparatus comprising a rotatable support structure, a quick freeze path rotatably mounted therein about an axis parallel to the axis of rotation of said structure and having a loading opening and a discharge opening, a loading station adjacent said structure, a discharge station adjacent said structure, means for operating said structure to present said freeze path intermittently to said stations with the respective openings of the path registering simultaneously with the respective stations, and means for rotating said quick freeze path with respect to said structure during operation of the structure.

4. Quick freeze apparatus comprising a rotatable drum having a plurality of longitudinal quick freeze paths circumferentially spaced thereabout, each of said paths comprising an opposed pair of freezing surfaces leading from a loading opening to a discharge opening, means for progressing material along each of said paths from its loading opening to its discharge opening, a loading station including means for feeding packaged material through an aligned loading opening of a quick freeze path, a discharge station including means for receiving frozen packages of material from an aligned discharge opening of a quick freeze path, and means for operating said drum to present said paths successively to said loading and discharge stations.

5. Quick freeze apparatus comprising rotatable means forming a refrigerant chamber, refrigerating surfaces forming at least one freezing path extending through the chamber for sliding progression of packages along the refrigerating surfaces, and means for intermittently effecting sliding progression of packages along the surfaces and for simultaneously feeding material to be frozen into the feed end of the path and removing frozen material from the discharge end of the path.

6. Quick freeze apparatus comprising rotatable means forming a refrigerant chamber, refrigerating surfaces forming at least one freezing tunnel extending through the chamber for sliding progression of packages therethrough, and feed means extending through the tunnel for intermittently effecting sliding progression of packages therethrough and for simultaneously feeding an unfrozen package into the feed end of the path and for removing a frozen package from the discharge end of the path.

7. Quick freeze apparatus comprising rotatable means forming a refrigerant chamber, refrigerating surfaces forming at least one freezing tunnel extending through the chamber for sliding progression of packages therethrough, and feed means including a one-way feed rack extending through the tunnel and operating means therefor located adjacent said rotatable means.

8. Quick freeze apparatus comprising a rotatable freezing structure, a plurality of freezing tubes mounted in the structure for sliding progression of packages of food therethrough, package progressing means for each tube, a package feed station adjacent said structure for cooperation with the feed openings of said tubes, a package discharge station adjacent said structure for cooperation with the discharge openings of the tubes, means for operating the structure to bring the tubes successively into simultaneous register with said stations, feed means for supplying a package to a tube aligned with the feed station, and means for simultaneously removing a package therefrom at the discharge station.

9. Quick freeze apparatus comprising a rotatable freezing structure, a plurality of freezing tubes mounted in the structure for sliding progression of packages of food therethrough, package progressing means for each tube, a package feed station adjacent said structure for cooperation with the feed openings of said tubes, a package discharge station adjacent said structure for cooperation with the discharge openings of the tubes, means for operating the structure to bring the tubes successively into simultaneous register with said stations, feed means at said feed station for supplying a package to a tube aligned with the feed station and including operating means for said package progressing means, and means for simultaneously removing a package therefrom at the discharge station.

10. Quick freeze apparatus comprising a freezing structure, means providing a plurality of freezing paths in the structure for sliding progression of packages of food therethrough, package progressing means for each path, a package feed station adjacent said structure for cooperation with the feed ends of said paths and including means for feeding packages of food to said paths, and a package discharge station adjacent said structure for cooperation with the discharge ends of the paths to receive frozen packages of food therefrom.

11. Quick freeze apparatus comprising a rotatable freezing structure, a plurality of freezing tubes rotatably mounted in the structure and constructed for sliding progression of packages of food therethrough, package progressing means for each tube, a package feed station associated with the structure, a package discharge station associated with the structure, means for operating the structure to bring the tubes successively into register with said stations for feeding and removal of packages from the tubes, and means for rotating the tubes in synchronism with the rotation of the structure to maintain a relatively fixed orientation of the freezing tubes.

12. Quick freeze apparatus comprising a rotatable freezing structure, a freezing tube rotatably mounted in the structure and constructed for sliding progression of packages of food therethrough, package progressing means for the tube, a package feed station associated with the structure, a package discharge station associated with the structure, means for operating the structure to bring the tube intermittently into registry with said stations for feeding and removal of packages from the tube, and means for rotating the tube in synchronism with the rotation of the structure to maintain a relatively fixed orientation of the freezing tube.

13. Quick freeze apparatus comprising a freezing structure, means providing a plurality of freezing paths in the structure for sliding progression of packages of food therealong, package progressing means disposed along each path and having progressor elements projecting into the path for engagement with packages therein, a package feed station adjacent said structure for cooperation with the feed ends of said paths and including means for feeding packages of food to said paths, and a package discharge station adjacent said structure for cooperation with the discharge ends of the paths to receive frozen packages of food therefrom.

14. Quick freeze apparatus comprising a freezing structure, means providing a plurality of parallel freezing paths in the structure for sliding progression of packages of food therethrough, package progressing means for each path, a package feed station adjacent said structure including a single file conveyor for presenting a single file of packages of food to the freezing structure, means for delivering successive packages of said file to said respective freezing paths for progression therethrough as a plurality of parallel files, and a package discharge station adjacent said structure for receiving packages of frozen foods from the discharge ends of the paths.

ROY M. MAGNUSON.

REFERENCES CITED

The following references are of record in the file of this patent:

UNITED STATES PATENTS

| Number | Name | Date |
|---|---|---|
| 2,215,486 | Stone | Sept. 24, 1940 |
| 2,263,794 | Wyen | Nov. 25, 1941 |
| 2,281,944 | Miller et la. | May 5, 1942 |